United States Patent [19]
Parruck et al.

[11] Patent Number: 5,331,641
[45] Date of Patent: Jul. 19, 1994

[54] METHODS AND APPARATUS FOR RETIMING AND REALIGNMENT OF STS-1 SIGNALS INTO STS-3 TYPE SIGNAL

[75] Inventors: Bidyut Parruck, Stratford; Robert W. Hamlin, Jr., Huntington, both of Conn.

[73] Assignee: TranSwitch Corp., Shelton, Conn.

[21] Appl. No.: 848,384

[22] Filed: Mar. 9, 1992

Related U.S. Application Data

[63] Continuation-in-part of Ser. No. 559,636, Jul. 27, 1990, Pat. No. 5,142,529.

[51] Int. Cl.$^5$ .............................................. H04J 14/08
[52] U.S. Cl. .................................. 370/102; 370/105.1; 375/118; 359/158
[58] Field of Search ...................... 370/84, 100.1, 102, 370/105.1, 105.3, 105.4, 106, 108; 359/115, 118, 135, 158; 375/118

[56] References Cited

U.S. PATENT DOCUMENTS

| | | | |
|---|---|---|---|
| 5,030,951 | 7/1991 | Eda et al. ........................ | 370/102 X |
| 5,040,170 | 8/1991 | Upp et al. ......................... | 370/99 X |
| 5,065,396 | 11/9991 | Castellano et al. ................. | 370/84 |
| 5,142,529 | 8/1992 | Parruck et al. ..................... | 370/84 |
| 5,157,655 | 10/1992 | Hamlin, Jr. et al. ............... | 370/102 X |

Primary Examiner—Douglas W. Olms
Assistant Examiner—Melvin Marcelo
Attorney, Agent, or Firm—David P. Gordon

[57] ABSTRACT

Apparatus and methods for retiming an STS-3 type signal are provided. The SPE of an incoming STS-3 type signal is demultiplexed into three STS-1 payloads and fed to three FIFOs, and a byte which is synchronous with the TOH is tracked through the three FIFOs to provide an indication of the FIFO depth. A frame count is also kept to track the number of frames since a last pointer movement. Stuffs or destuffs are generated based on the FIFO depth as well as based on the frame count, with a stuff or destuff generated as quickly as four frames from a previous pointer movement if the FIFO is close to full or close to empty, and less quickly (e.g., at thirty-two frames from a previous pointer movement) if the FIFO is only starting to empty or to fill. Where the STS-3 type signal is a STS-3C signal, the decision on whether to stuff or destuff is made with reference to all three depth measurement circuits as all the STS-1 payloads must be stuffed or destuffed together. Also, to realign the STS-1 components of the STS-3C signal, the J1 bytes of the signal are tracked through the FIFOs, and a logic circuit is provided having phase 3 of the outgoing STS-3 clock, and the three J1 byte control signals as inputs. The logic circuit inhibits a read of a J1 byte from any particular FIFO unless all FIFO's have a high J1 signal at phase 3 of the clock.

29 Claims, 9 Drawing Sheets

FIG. 4a

| FIFO DEPTH #1 | FIFO DEPTH #2 | FIFO DEPTH #3 | FRAME COUNT | ACTION |
|---|---|---|---|---|
| + SOFT THRESHOLD | + SOFT THRESHOLD | + SOFT THRESHOLD | >LONG | DECREMENT |
| - SOFT THRESHOLD | - SOFT THRESHOLD | - SOFT THRESHOLD | >LONG | INCREMENT |
| + HARD THRESHOLD | + HARD THRESHOLD | + HARD THRESHOLD | >SHORT | DECREMENT |
| + HARD THRESHOLD | + SOFT THRESHOLD | + SOFT THRESHOLD | >SHORT | DECREMENT |
| + HARD THRESHOLD | + HARD THRESHOLD | + SOFT THRESHOLD | >SHORT | DECREMENT |
| + SOFT THRESHOLD | + HARD THRESHOLD | + SOFT THRESHOLD | >SHORT | DECREMENT |
| + SOFT THRESHOLD | + HARD THRESHOLD | + HARD THRESHOLD | >SHORT | DECREMENT |
| + SOFT THRESHOLD | + SOFT THRESHOLD | + HARD THRESHOLD | >SHORT | DECREMENT |
| - HARD THRESHOLD | - HARD THRESHOLD | - HARD THRESHOLD | >SHORT | INCREMENT |
| - HARD THRESHOLD | - SOFT THRESHOLD | - SOFT THRESHOLD | >SHORT | INCREMENT |
| - HARD THRESHOLD | - HARD THRESHOLD | - SOFT THRESHOLD | >SHORT | INCREMENT |
| - HARD THRESHOLD | - SOFT THRESHOLD | - HARD THRESHOLD | >SHORT | INCREMENT |
| - SOFT THRESHOLD | - SOFT THRESHOLD | - HARD THRESHOLD | >SHORT | INCREMENT |
| - SOFT THRESHOLD | - HARD THRESHOLD | - SOFT THRESHOLD | >SHORT | INCREMENT |
| SOFT THRESHOLD | NORMAL | NORMAL | ANY VALUE | NONE |
| SOFT THRESHOLD | NORMAL | SOFT THRESHOLD | ANY VALUE | NONE |
| NORMAL | NORMAL | SOFT THRESHOLD | ANY VALUE | NONE |
| NORMAL | SOFT THRESHOLD | NORMAL | ANY VALUE | NONE |
| NORMAL | SOFT THRESHOLD | SOFT THRESHOLD | ANY VALUE | NONE |
| NORMAL | SOFT THRESHOLD | NORMAL | ANY VALUE | NONE |
| SOFT THRESHOLD | NORMAL | NORMAL | ANY VALUE | NONE |
| SOFT THRESHOLD | SOFT THRESHOLD | NORMAL | ANY VALUE | NONE |
| - SOFT THRESHOLD | - SOFT THRESHOLD | NORMAL, SOFT THRESHOLD | ANY VALUE | NONE |
| + SOFT THRESHOLD | + SOFT THRESHOLD | NORMAL, SOFT THRESHOLD | ANY VALUE | NONE |
| - SOFT THRESHOLD | + SOFT THRESHOLD | NORMAL, SOFT THRESHOLD | ANY VALUE | NONE |

FIG. 4b

| FIFO DEPTH #1 | FIFO DEPTH #2 | FIFO DEPTH #3 | FRAME COUNT | ACTION |
|---|---|---|---|---|
| NORMAL, SOFT THRESHOLD | +SOFT THRESHOLD | -SOFT THRESHOLD | ANY VALUE | NONE |
| NORMAL, SOFT THRESHOLD | -SOFT THRESHOLD | +SOFT THRESHOLD | ANY VALUE | NONE |
| +SOFT THRESHOLD | NORMAL, SOFT THRESHOLD | -SOFT THRESHOLD | ANY VALUE | NONE |
| -SOFT THRESHOLD | NORMAL, SOFT THRESHOLD | +SOFT THRESHOLD | ANY VALUE | NONE |
| +HARD THRESHOLD | +HARD THRESHOLD, NORMAL | +HARD THRESHOLD, NORMAL | >SHORT | DECREMENT |
| +HARD THRESHOLD, NORMAL | +HARD THRESHOLD | +HARD THRESHOLD, NORMAL | >SHORT | DECREMENT |
| +HARD THRESHOLD, NORMAL | +HARD THRESHOLD, NORMAL | +HARD THRESHOLD | >SHORT | DECREMENT |
| -HARD THRESHOLD | -HARD THRESHOLD, NORMAL | -HARD THRESHOLD, NORMAL | >SHORT | INCREMENT |
| -HARD THRESHOLD, NORMAL | -HARD THRESHOLD | -HARD THRESHOLD, NORMAL | >SHORT | INCREMENT |
| -HARD THRESHOLD, NORMAL | -HARD THRESHOLD, NORMAL | -HARD THRESHOLD | >SHORT | INCREMENT |
| +HARD THRESHOLD | <-SOFT THRESHOLD | ANY VALUE | ANY VALUE | ERROR |
| -HARD THRESHOLD | ANY VALUE | <-SOFT THRESHOLD | ANY VALUE | ERROR |
| +HARD THRESHOLD | >+SOFT THRESHOLD | ANY VALUE | ANY VALUE | ERROR |
| -HARD THRESHOLD | ANY VALUE | >+SOFT THRESHOLD | ANY VALUE | ERROR |
| ANY VALUE | +HARD THRESHOLD | ANY VALUE | ANY VALUE | ERROR |
| ANY VALUE | +HARD THRESHOLD | ANY VALUE | ANY VALUE | ERROR |
| ANY VALUE | -HARD THRESHOLD | ANY VALUE | ANY VALUE | ERROR |
| ANY VALUE | -HARD THRESHOLD | ANY VALUE | ANY VALUE | ERROR |
| ANY VALUE | ANY VALUE | +HARD THRESHOLD | ANY VALUE | ERROR |
| ANY VALUE | ANY VALUE | +HARD THRESHOLD | ANY VALUE | ERROR |
| ANY VALUE | ANY VALUE | -HARD THRESHOLD | ANY VALUE | ERROR |
| ANY VALUE | ANY VALUE | -HARD THRESHOLD | ANY VALUE | ERROR |
| NORMAL | NORMAL | NORMAL | ANY VALUE | NONE |
| ANY VALUE | ANY VALUE | ANY VALUE | <SHORT | NONE |

POH = PATH OVERHEAD BYTE

▨ : STS-Nc PAYLOAD CAPACITY

FIG. 6b
PRIOR ART
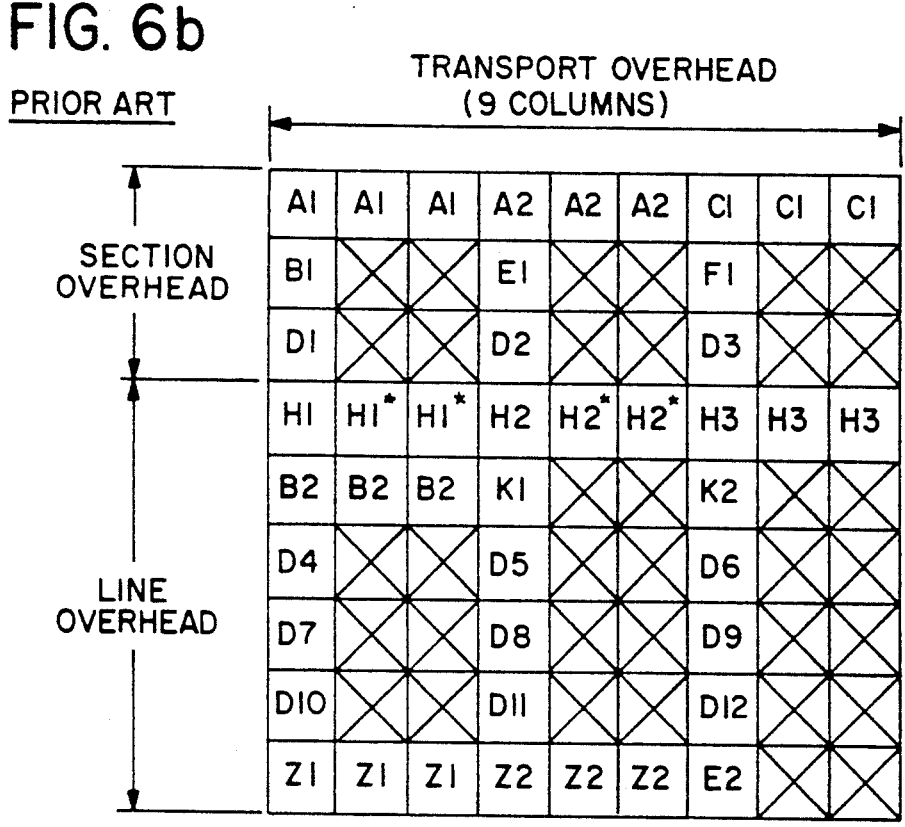
 : UNDEFINED OVERHEAD BYTE (ALL-ZEROS PATTERN AS AN OBJECTIVE)
* : CONCATENATION INDICATION
  H1*(10010011)
  H2*(11111111)

ns of an STS-3 or STS-3C signal.

METHODS AND APPARATUS FOR RETIMING AND REALIGNMENT OF STS-1 SIGNALS INTO STS-3 TYPE SIGNAL

This is a continuation-in-part of Ser. No. 07/559,636 filed Jul. 27, 1990 which is hereby incorporated by reference herein in its entirety, now U.S. Pat. No. 5,142,529.

BACKGROUND OF THE INVENTION

This invention generally relates to the optical telecommunications network. More particularly, this invention relates to the retiming and realignment of higher speed SONET signals upon the recombination of the higher speed SONET signals after they have been broken down into lower speed components and then either cross-connected and/or sent through via different paths through a switched network.

The telecommunications network servicing the Unites States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper cable and with lower attenuation.

While fiber optic cable represents the future in telecommunications, presently there remains an entire telecommunications network comprised of various cable types, served by equipment of different vintages, and run according to various coexisting transmission standards. While older standards, cables, and equipment will be eventually phased out, for the time being it is necessary that all the old and new standards, equipment and transmission lines be as compatible as possible. In fact, even where relatively new optical network equipment is in 4 place, such as cross-connection (switch) equipment capable of handling SONET signals such as STS-1 signals, even higher level signals (such as STS-3 and STS-3C, details of which are seen in prior art FIGS. 6a–6d) are being generated. Typically, cross-connection equipment for such high level signals is unavailable or not commonly in place. Thus, in order for higher level signals to be utilized, mechanisms for accommodating the higher level signals to the lower level equipment are necessary; i.e., backwards compatability is required.

SUMMARY OF THE INVENTION

It is therefore an object of the invention to provide mechanisms for the recombination of higher level telecommunication signals after they have been broken into a plurality of constituent components for cross-connection by lower level cross-connection equipment and/or for transmission over the switched network.

It is another object of the invention to provide methods and apparatus for retiming and realignment of STS-1 components of an STS-3 or STS-3C signal.

It is a further object of the invention to provide methods and apparatus for retiming STS-1 components of an STS-3 signal by stuffing and destuffing the STS-1 components where the outgoing STS-3 signal is at a different data rate than the incoming STS-3 signal.

It is also an object of the invention to provide an algorithm for controlling the stuffing and destuffing of an STS-1 component of an STS-3 signal according to an algorithm so as to reduce signal jitter.

Yet another object of the invention is to provide an algorithm for controlling the stuffing and destuffing of an STS-3C signal.

An additional object of the invention is to provide methods and apparatus for realigning the STS-1 components of an STS-3C signal where the delay of each of the STS-1 components through a cross-connecting apparatus may be different.

In accord with the objects of the invention, an apparatus for retiming an STS-3 type signal is provided and generally comprises a demultiplexer for demultiplexing the synchronous payload envelope (SPE) of the STS-3 type signal into three STS-1 payloads and for tracking at least one byte which is synchronous with the transport overhead (TOH) bytes, three FIFOs for receiving the STS-1 payloads, FIFO depth measurement circuitry associated with each FIFO for measuring the number of bytes in the FIFOs, logic circuitry associated with the FIFO depth measurement circuitry for generating a stuff or destuff signal as quickly as four frames from a previous pointer movement if the FIFO is close to full or close to empty and less quickly if the FIFO is only starting to empty or to fill, and a multiplexer for reading data out of the FIFOs and generating a new STS-3 type signal at a rate similar to the rate of the incoming STS-3 type signal. Preferably, in demultiplexing the SPE of the STS-3 signal and writing SPE data to the FIFOs, a recycling N counter is used in conjunction with an SPE control signal and the incoming clock. Also, preferably, in determining whether to stuff or destuff, the FIFO depth measurement circuitry counts the number of bytes that occur between the writing of a byte which is synchronous with the TOH (such as the byte which follows the J1 byte) into the FIFO and the reading of that byte out of the FIFO. Where the number of bytes exceeds a first (soft) full threshold or is less than a first (soft) empty threshold, a stuff or destuff is generated preferably $32-x$ frames later, where $x=31$ or the number of frames since the last pointer movement, whichever is less, while if the number of bytes exceeds a second (hard) full threshold, or is less than a second (hard) empty threshold, the stuff or destuff is generated preferably $5-y$ frames later, where $y=4$ or the number of frames since the last pointer movement, whichever is less. A frame counter is preferably provided as part of the apparatus to track the number of frames since the previous pointer movement.

In accord with another aspect of the invention, where the incoming signal and outgoing signals are STS-3C signals, the decision on whether to stuff or destuff is preferably made by reference to all three depth measurement circuits as with the retiming apparatus for the STS-3C signal, all the STS-1 payloads must be stuffed or destuffed together. An algorithm is provided which looks at whether a soft or hard threshold has been met, along with the direction of the threshold, and the number of depth measurement circuits meeting a threshold, in order to determine whether a stuff or destuff should occur.

Further, with respect to the STS-3C signal, an apparatus and method for realigning the STS-1 components of the STS-3C signal are provided. The realignment apparatus generally comprises means for generating a POH synchronous byte control signal (e.g., the J1 bytes), means in the FIFO means for tracking the J1 bytes via the J1 byte control signals, and logic means having the phase 3 of the outgoing STS-3 clock, and the three J1 byte control signals as inputs. The logic means inhibits a read of a J1 byte from any particular FIFO unless all FIFO's have a high J1 signal at phase 3 of the clock.

Additional objects and advantages of the invention will become apparent to those skilled in the art upon reference to the detailed description taken in conjunction with the provided figures.

BRIEF DESCRIPTION OF THE DRAWINGS

FIGS. 4a and 4b together comprise a chart of the decision mechanism for the retiming apparatus of FIG. 2 for STS-3C signals;

FIGS. 5b and 5c are timing diagrams for an aligned STS-3C signal and for a misaligned STS-3C which is realigned by the apparatus of FIG. 5a; and FIGS. 6a, 6b, and 6c are prior art diagrams showing the formats of an STS-N frame, an STS-3c transport overhead, an STS-NC SPE, and an STS-3 SPE.

DETAILED DESCRIPTION OF THE PREFERRED EMBODIMENTS

Figure 1:
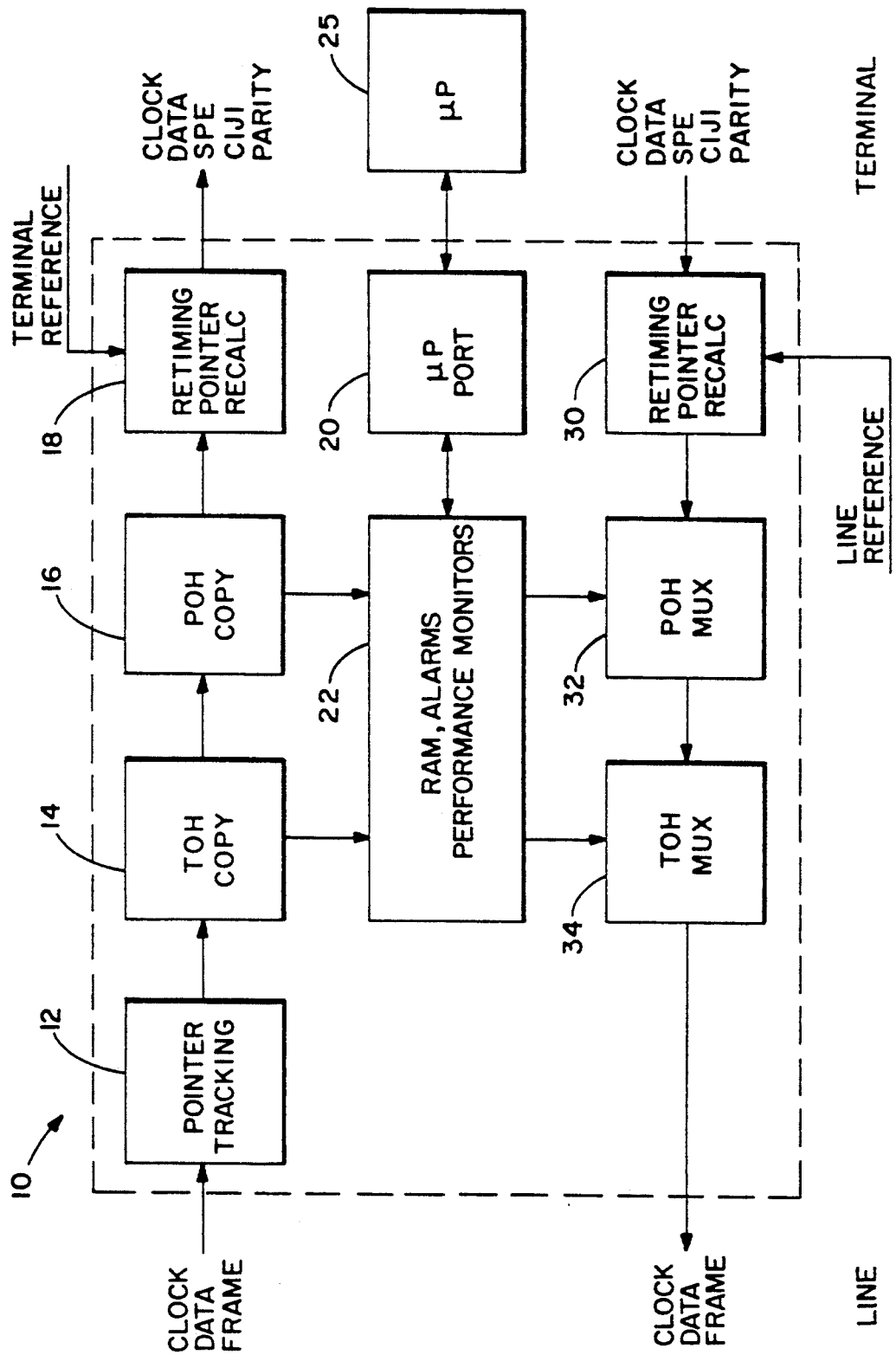
FIG. 1 is a block diagram of a preferred STS-3 type terminator apparatus in which the retiming and realignment apparatus of the invention are found.

The preferred STS-3 type terminator apparatus 10 of the invention is seen in FIG. 1. The terminator apparatus 10 includes receive circuitry as well as transmit circuitry, and both the receive and transmit circuitry can be used, if desired, in conjunction with cross-connection equipment. The terminator apparatus 10 shown finds particular use in conjunction with cross-connection equipment capable of cross-connecting STS-1 type signals, although it can also be used in conjunction with a terminal or add/drop circuit. It will be appreciated by those skilled in the art that the receive and transmit circuitry of the terminator apparatus 10 of the invention need not be located on the same physical apparatus.

As seen in FIG. 1, on the receive side, where the terminator apparatus 10 receives a clock signal, a data signal, and a frame signal, pointer tracking circuitry 12 as is known in the art is used to find the pointers H1H2 for each of the STS-1 payloads in the received STS-3 signal. Where the incoming data signal is an STS-3C signal, only one H1H2 pointer is found, as the other Hi bytes are provided with a concatenation indication (10010011), and the other H2 bytes are provided with a concatenation indication (11111111)—as may be seen with reference to prior art FIG. 6b.

In accord with the preferred embodiment of the invention, in the terminator apparatus 10, once the H1H2 pointer(s) is located, the transmit overhead (TOH) and path overhead (POH) are both easily located. The TOH is copied at TOH copy circuitry 14, and the TOH bytes are sent to the data RAM 22, from which they may be read by an external microprocessor 25. Similarly, the POH copying circuit 16 copies the POH bytes and sends them to data RAM 22 for monitoring purposes. Thus, as shown in FIG. 1, alarm and performance monitors are provided in conjunction with the RAM 22. The monitors, among other things, preferably perform B1, B2, and B3 parity calculations, pointer justification monitoring, and alarm calculation. Sixteen bit counters (not shown) are preferably used to record parity errors, while eight bit counter (not shown) monitor the number of new data flags and pointer justifications. The counter values and alarm status bits are supplied to the microprocessor port or interface 20.

Figure 6A:
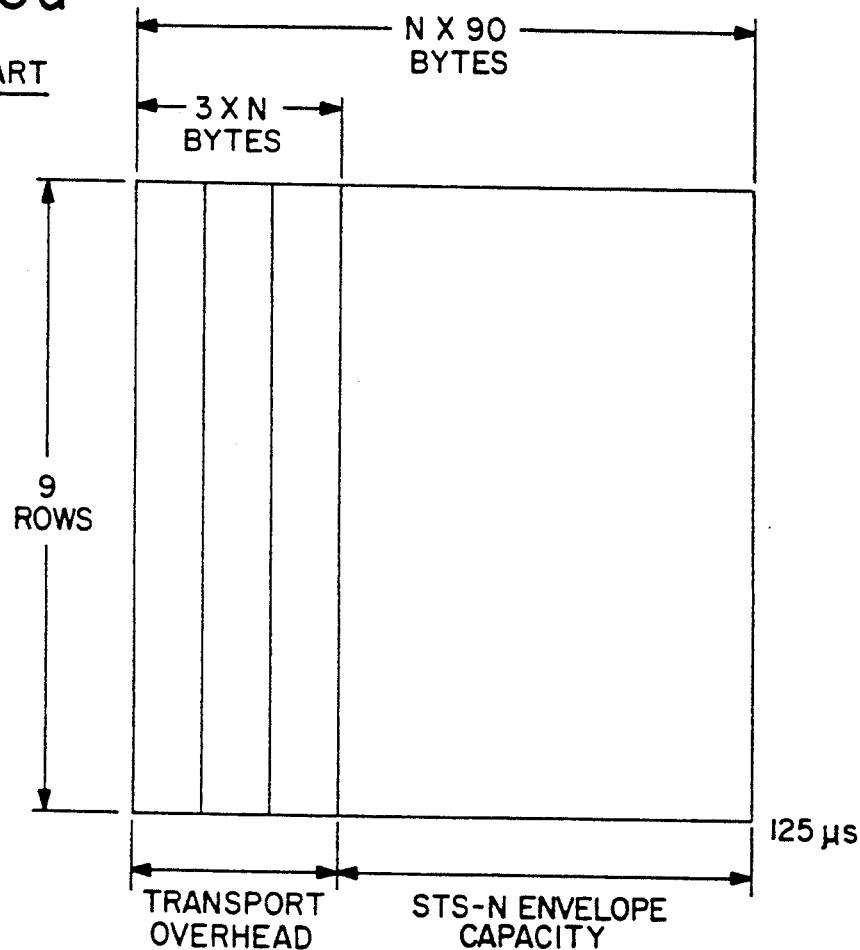
Figure 6C:
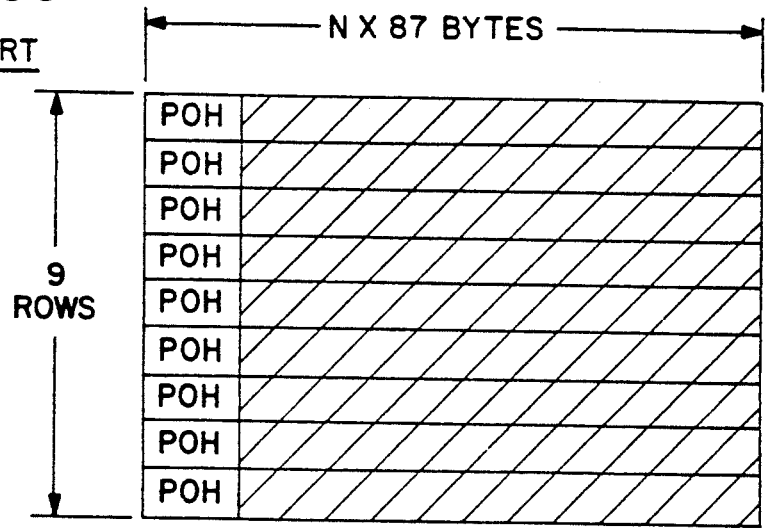

Returning to the discussion of the incoming STS-3 type signal, after the TOH and POH have been copied and sent to RAM 22, the STS-3 type signal is then sent to the retiming and pointer calculation block 18. Also sent to the retiming and pointer calculation block 18 is a SPE control signal which is high when the block 18 is receiving the SPE, a C1J1 control signal which is high when the C1 and the J1 bytes are being received by the block 18, and the incoming clock signal. As will be described in more detail hereinafter with reference to FIG. 2, the retiming and pointer recalculation block takes the incoming signal at the incoming STS-3 rate, demultiplexes the signal into three STS-1 type components, calculates new pointers (e.g., H1H2) for each STS-1 type signal, stuffs and destuffs the STS-1 signals as appropriate (in bytes H3 as seen in FIG. 6b and the first byte after the H3 byte—hereinafter referred to as byte0), and multiplexes the three STS-1 signals back into a retimed STS-3 type signal for output at the terminal side clock rate. In a typical application, the retimed STS-3 type signal are then demultiplexed again into STS-1 signals, and cross-connected using STS-1 type cross-connects. The cross-connected signals are then remultiplexed and fed to the "output side" of the same or other terminator blocks 10, details of which will be discussed below. In another application, rather than demultiplexing the STS-3 signals into STS-1 signals which are cross-connected, the STS-3 signal can be terminated; i.e., sent to a terminal. Also, instead of multiplexing the STS-1 signals into an STS-3 signal which is then demultiplexed and cross-connected, the individual STS-1 signals can be terminated.

On the output side of the terminator block 10, an STS-3 type signal is received which is comprised of three STS-1 signals which typically have been cross-connected and multiplexed together. Because the STS-3 signals coming back from the cross-connect are at a data rate which may be different then the outgoing STS-3 line rate, the signals are demultiplexed, retimed again, and multiplexed again at retiming and pointer calculation block 30 (which is typically identical to block 18). However, in reconstituting the STS-3 signal, the path overhead (except for H4) and transport overhead bytes are multiplexed into the signal at POH mux 32 and TOH mux 34 respectively. The information for these overhead bytes is preferably taken from RAM 22 which receives its information from the alarm and performance monitors and the microprocessor 25.

Figure 2:
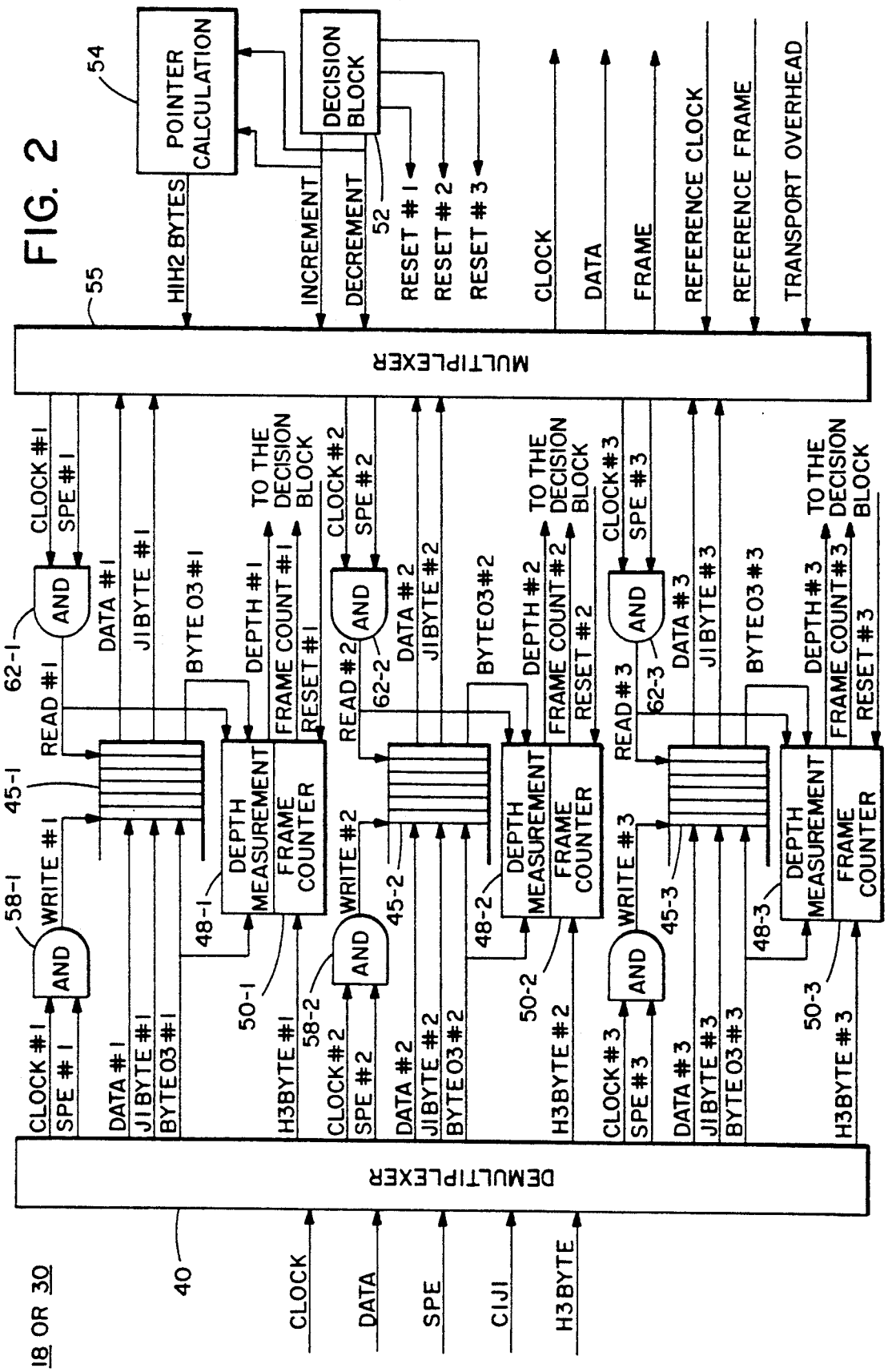
FIG. 2 is a high level block diagram of the preferred retiming apparatus of the invention for STS-3 and STS-3C signals.

Turning to FIG. 2, details of the retiming and pointer calculation block 18 (and 30) are seen. In particular, the retiming apparatus of the invention includes a demultiplexer 40 for demultiplexing an incoming STS-3 type signal into three STS-1 type signals, three FIFOs 45-1, 45-2, and 45-3 for receiving the STS-1 signals, three depth measurement blocks 48-1, 48-2, and 48-3 for measuring the amount of data in the FIFOs, three frame counters 50-1, 50-2, 50-3 for counting the number of frames of data that have been demultiplexed since a pointer movement, logic decision block 52 for generating pointer movement (increments and decrements)

based on the amount of data in each of the FIFOs, a pointer calculation block 54 for generating the pointers in response to information from logic decision block 52, and a multiplexer 55 for multiplexing the SPE data from each of the FIFOs, the pointer information as recalculated by the pointer calculation block 54, as well as other TOH data which may be either "dummy" information (i.e., all zeros), or data obtained from the RAM (of FIG. 1).

The data input to the demultiplexer 40 is effectively the STS-3 signal. Accompanying the data input are the incoming STS-3 clock, an SPE control signal which indicates when the incoming data is SPE data, a H3 byte indicator control, and a C1J1 byte control signal. The SPE control signal is high only when the data byte being received by the demultiplexer 40 is an SPE byte (i.e., a data byte or a POH byte). The C1J1 byte control signal is high whenever the byte being received by the demultiplexer is a C1 or a J1 byte. For an STS-3 frame, the C1 pulse goes high only for the first C1 byte, and the J1 pulses go high for the J1 byte of each of the three received payloads. The SPE signal is used to distinguish whether the C1J1 high pulse is a C1 pulse or a J1 pulse, as when SPE is high and C1J1 is high, a J1 (POH) byte is being transmitted, and when SPE is low and C1J1 is high, the C1 (TOH) byte is being transmitted. As will be discussed hereinafter, the J1 pulses are necessary for the realignment mechanism of the invention, while C1 pulse is preferably used for the retiming mechanism of the invention.

Demultiplexer 40 demultiplexes the incoming STS-3 type signal into three parts. Effectively, the incoming STS-3 clock signal is divided into three clocks (clock #1, clock #2, clock #3) by any 4 suitable means such as a revolving mod 3 counter (not 'shown). The resulting clocks, which are each at one-third the rate of the 6 incoming clock are each ANDed together with the SPE signal by AND gates 58-1, 58-2, 58-3 to generate three write signals (write #1, write #2, write #3). The write signals cause each of the FIFOs 45-1, 45-2, 45-3 to receive the demultiplexed data signals of the SPE only from the demultiplexer 40, with the TOH bytes being effectively demultiplexed out.

The FIFOs 45 of the invention are preferably implemented as register banks. The output of the registers are tristate drivers, and the registers are written to and read from via the use of two walking-one counters. The first walking-one counter (which is effectively a recirculating bucket-brigade having a single one value and all other zeros) is for writing, and acts to latch the incoming data to the selected (addressed) register; i.e., that register which has the one value of the walking-one counter. The second walking-one counter is for reading, and acts to enable the tristate output of the selected register.

The preferred FIFOs of the invention are at least twenty-nine bytes deep and ten bits wide. The particular twenty-nine bit depth of the FIFO is chosen based on the fact that it is desirable to accommodate at least twelve bytes of delay of one STS-1 signal relative to another STS-1 signal without generating an error signal; that it is desirable to absorb at least four successive incoming pointer movement (each four frames apart) without generating an outgoing pointer movement; and that at least six bytes of safety are desired. Each of these aspects will be discussed in more detail hereinafter. The ten bit width of the preferred FIFOs accommodates the eight bits of SPE data bytes, as well as the one bit control signals J1byte and byte03 which accompany the J1 and 03 bytes only (the 03 byte, for purposes herein being defined as the byte which follows the C1 byte). As aforementioned, the J1byte control signal is generated when the SPE is high and the C1J1 control input to demultiplexer 40 is high. The byte03 control signal, on the other hand is generated the first byte the SPE goes high after the SPE control is low and the C1J1 control input to demultiplexer 40 is high. Thus, the 03 byte is used because it is synchronous with the TOH, whereas, if the J1 byte which is synchronous with the SPE were used, a change in the location of the TOH would cause variations in depth measurement. It will be appreciated by those skilled in the art that other bytes synchronous with the TOH could also be used in lieu of the 03 byte.

The depth measurement blocks 48-1, 48-2, 48-3, are preferably counters. The counters use the byte03 control signal exiting the demultiplexer 40 as the start control, and the byte03 control signal exiting the FIFO means as the stop control with each hereinafter described read signal acting to increase the count. The count of the depth measurement block thereby provides an indication of exactly how many bytes were in the associated FIFO when the 03 byte was written to the FIFO. Upon the exiting of byte03 from the FIFO, the count of the depth measurement block is sent to the logic decision block 52. The logic decision block 52, which may be implemented with a microprocessor, a digital signal processor, or logic circuitry as desired, determines whether a stuff or a destuff is required for each particular outgoing STS-1 component. Where the incoming signal is a STS-3 signal, each STS-1 component can be stuffed or destuffed separately. However, where the incoming signal is a STS-3C signal, as will be described in more detail hereinafter, stuffing or destuffing of the STS-1 "components" must be done together.

The frame counter blocks 50-1, 50-2, 50-3 are also preferably counters. The frame counters use the H3 control signal exiting the demultiplexer 40 to increment the count, and as will be described in more detail hereinafter, are reset only upon pointer movement which effects a stuff or destuff of the FIFO associated with the frame counter. It should be appreciated that for an STS-3C signal, only one frame counter block is required, as the stuffs or destuffs of each STS-1 "component" of the STS-3C signal must occur together. Thus, the frame count since the last pointer movement will always be the same. Regardless of whether one or three frame counter blocks are used, the count(s) from the frame counter block(s) are provided to the logic decision block 52.

The output side of FIFOs 45 utilizes the outgoing (terminal side) clock and frame. In particular, the reference frame effectively determines when the TOH information is required, and hence when the SPE is required and when the POH information (which is part of the SPE) is required. The transport overhead, with the exception of the H1 and H2 bytes, is typically provided as null data (all zeros). The H1 and H2 bytes of the TOH which point to the start of the SPE are generated by the pointer calculation block 54 based on information received by the logic decision block 52 (as is described in more detail hereinafter, and as discussed in the parent application hereto). The only other information required in order to generate the outgoing SPE control signal is whether a stuff or destuff is required. However, that information is supplied by the increment and decrement controls output by the logic decision block 52. Thus, when a destuff is required for one, two, or all of the STS-1 components of the signal, the outgoing SPE control will be kept high for one, two, or all H3 bytes, while when a stuff is required for one, two, or all of the STS-1 components the outgoing SPE control will be kept low for one, two, or all of the three bytes following the H3 bytes.

The read control signals for the FIFOs are generated in much the same fashion as the write control signals. Thus, the terminal side reference clock is effectively demultiplexed into three clocks (outgoing clocks #1, #2, #3), and each outgoing clock is ANDed with its respective outgoing SPE control signal at AND gates 62-1, 62-2, 62-3. Where the outgoing signal is an STS-3C signal, the three different output SPE control signals will always be high and low together. However, where the outgoing signal is an STS-3 signal, since one STS-1 component may require a destuff when the other components do not require a destuff, it is possible for one or two outgoing SPE control signals to be high with the other(s) low. On those occasions, the multiplexer 55 will receive a TOH byte from, e.g., RAM for one or two H3 bytes, while receiving an SPE data signal from one of the FIFOs for the other H3 byte(s). Regardless, multiplexer 55 multiplexes the data signals from FIFOs 45 together with the H1H2 byte information from the pointer calculation means as well as other TOH information (which may be all zeros or may be TOH data from the RAM), into an STS-3 type signal (i.e., STS-3 or STS-3C signal).

Figure 3:
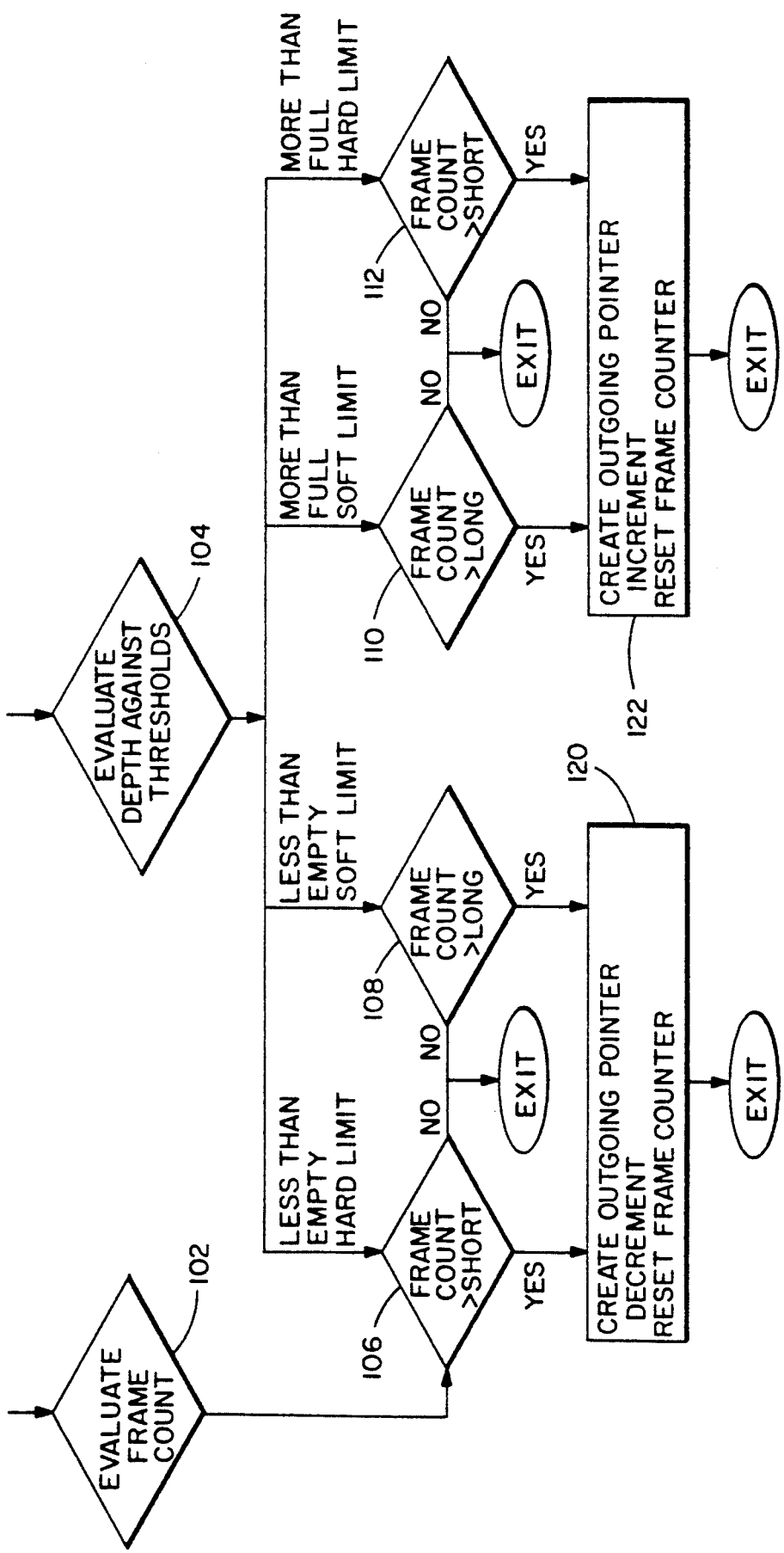
FIG. 3 is a flow chart of the decision mechanism for the retiming apparatus of FIG. 2 for STS-3 signals.

Turning to FIG. 3, a flow chart of the logic decision block 52 for an STS-3 signal is seen. Implementation of the logic decision block in discrete logic can be generated by code input (attached as Appendix B hereto) into the AutoLogic automatic logic synthesis and schematic generation system produced by Mentor Graphics Corporation of Wilsonville, Oregon. The function of the logic decision block 52 is to determine when a stuff or destuff is needed, as well as to generate a control signal which will cause the stuff or destuff to be effected. Another function of the logic decision block 52 is to generate the stuff and destuff control signals in a manner which limits jitter. As previously described, the inputs to the logic decision block include the frame count(s) and the depth measurements. At step 102, the logic decision block 52 compares each frame count to two different thresholds: a "short" threshold; and a "long" threshold. The "short" threshold is preferably four frames as according to standards, two pointer movements cannot be conducted within four frames of each other. The "long" threshold is preferably thirty-two frames, as the maximum permissable difference between two SONET signals is 40 ppm, which amounts to a pointer movement every approximately thirty-one frames. Thus, if two SONET differences are near the maximum permissable difference, and there are no errors in the signals, the long threshold provides a mechanism which permits pointer movement on a regular basis to accommodate the permissable differences in the signals without having to conduct a more jittery short threshold pointer movement.

At 104, the logic decision block 52 compares each depth measurement count to four different thresholds: an "empty hard limit"; an "empty soft limit"; a "full soft limit" and a "full hard limit". In the preferred embodiment where the FIFO depth is twenty-nine bytes, the empty hard limit is set at seven bytes, the empty soft limit is set at eleven bytes, the full soft limit is set at nineteen bytes, and the empty hard limit is set at twenty-three bytes. Thus, the previously discussed safety margin of six bytes is provided on either end, and the difference between the empty hard limit and the full soft limit (as well as the full hard and empty soft limits) is the preferred twelve bytes.

In accord with the invention, if the particular FIFO depth is less than the empty hard limit (e.g., seven bytes), at 106, a check is made to see whether the frame count is greater than the short frame count, and if so, at 120, an outgoing pointer increment (stuff) control signal is generated, and the frame counter for the particular FIFO is reset. On the other hand, if the frame count is less than the short frame count, a pointer movement is not allowed, and the logic decision block 52 waits another frame for the next depth evaluation for the particular FIFO. Similarly, at 108, if the particular FIFO depth is greater than the empty hard limit (e.g., seven bytes) but less than the empty soft limit (e.g., eleven bytes), a check is made to see whether the frame count is greater than the long frame count (e.g., thirty-two bytes). If yes, at 120, the outgoing pointer increment control signal is generated and the frame counter for the particular FIFO is reset. If not, the pointer movement is not allowed, and the logic decision block waits another frame for the next depth evaluation of the particular FIFO.

At 110 and 112, the logic decision block makes similar comparisons to those of steps 106 and 108, but for the situation where the byte depth is greater than the soft or hard full limits. Thus, at 110, if the byte depth is greater than the full soft limit (e.g., nineteen bytes) but less than the full hard limit (twenty-three bytes), then if the frame count is greater than the long frame count threshold (e.g., thirty-two bytes), at 122 a pointed decrement (destuff—insert data into H3) control signal is generated and the frame counter for the particular FIFO is reset. On the other hand, if the frame count is less than the full soft limit, no pointer movement is allowed, and the logic decision block waits another frame for the next depth evaluation of the particular FIFO. Similarly, if the byte depth is greater than the full hard limit (e.g., twenty-three bytes), at 112 a determination is made as to whether the frame count is greater than the short frame count of four bytes. If yes, then at 122 the pointer decrement control signal is generated and the frame counter for the particular FIFO is reset. If not, no pointer movement is allowed, and the logic decision block waits another frame for the next depth evaluation of the particular FIFO.

In typical functioning, the FIFOs will have fifteen bytes contained therein. Thus, should the outgoing STS-3 type signal be at a slightly faster rate than the incoming STS-3 type signal, reads from the FIFOs will occur slightly more often than writes to the FIFOs. As a result, the FIFOs will be short on data, the empty soft limit will be reached after many frames, and a stuff signal (pointer increment) will be generated. Similarly, should the outgoing STS-3 type signal be at a slightly slower rate than the incoming STS-3 type signal, writes to the FIFOs will occur slightly more often than reads from the FIFOs. As a result, the FIFOs will be long on data (i.e., will fill), the full soft limit will be reached after many frames, and a destuff (pointer decrement) will be generated. By requiring that at least thirty-two data frames have passed since a previous pointer movement in the case of meeting the full soft or empty soft limits, limited jitter is guaranteed. Also, by setting the soft thresholds such that the FIFO must have four additional or four fewer bytes than expected to effect point movement, slight relative movements of the data rates (jitter) which might later cancel out are accommodated without the requirement of pointer movement. Further, by causing pointer movement to occur as soon as possible after the empty or full hard limits, the logic decision block effectively accommodates the exigency of the FIFO running out of data or overflowing. Also, by setting the hard thresholds more than four bytes from the empty or overflow states, continuing operation with stuffing or destuffing is guaranteed even if the difference in incoming and outgoing data rates is as large as one byte per four frames.

As aforementioned, where the incoming and outgoing signals are STS-3C signals, only one frame counter block 50 is required or utilized, and any stuffs and destuffs must be made to all three STS-1 components at the same time. The logic of the logic decision block for making stuffs and destuffs for the STS-3C signal case is seen in FIGS. 4a and 4b. As seen in FIGS. 4a and 4b, the decision on whether to stuff or destuff is made as a function of the status (i.e., count <empty hard limit; count <empty soft limit; count >full soft limit; count >full hard limit) of all of the depth measurement blocks as well as the frame count status (i.e., frame count>short; frame count>long). As seen in FIGS. 4a and 4b, where all of the depth measurement indications are the same, the decision to stuff or destuff is made accordingly; provided, or course, that where hard FIFO depth thresholds are exceeded, a stuff or destuff is carried out when the frame count exceeds the short frame count threshold (four frames), and that where soft thresholds are exceeded, the stuff or destuff is carried out when the frame count exceeds the long frame count threshold. Also, as seen in FIGS. 4a and 4b, where any of the FIFOs exceed a hard FIFO depth threshold, a stuff or destuff is carried out (for all STS-1 components) if the frame count exceeds the short frame count threshold regardless of the position of the other FIFOs, as long as the other FIFOs either exceed a soft or hard threshold in he same direction, or are in the normal range. However, where one of the FIFOs exceeds the soft or hard threshold in a direction opposite to the FIFO exceeding the hard FIFO depth threshold, an error signal is generated (see FIG. 4b) to indicate that the incoming STS-1 offset is greater than permitted.

With regard to the soft FIFO depth thresholds, a stuff or destuff is only made where all three FIFOs have the same indication. Thus, if two FIFOs show that a soft threshold is exceeded, but one FIFO shows that the soft threshold is not exceeded, no action is taken. Likewise, where two different FIFOs show that soft thresholds in different directions are exceeded, no action is taken.

With the STS-3C signals, as aforementioned, stuffs and destuffs must be made to all of the STS-1 Components at the same time. This is because the structure of the STS-3C signal is more rigid than the structure of the STS-3 signal in that each byte of each STS-1 component is aligned with the other bytes of the other STS-1 components. Thus, all of the SPEs will start at the same location, all of the path overhead bytes (e.g., J1) will be located together, etc. However, only one H1H2 SPE pointer, is provided in the STS-3C signal, with the other H1 and H2 byte locations being provided with predefined values to indicate an STS-3C signal.

Figure 5A:
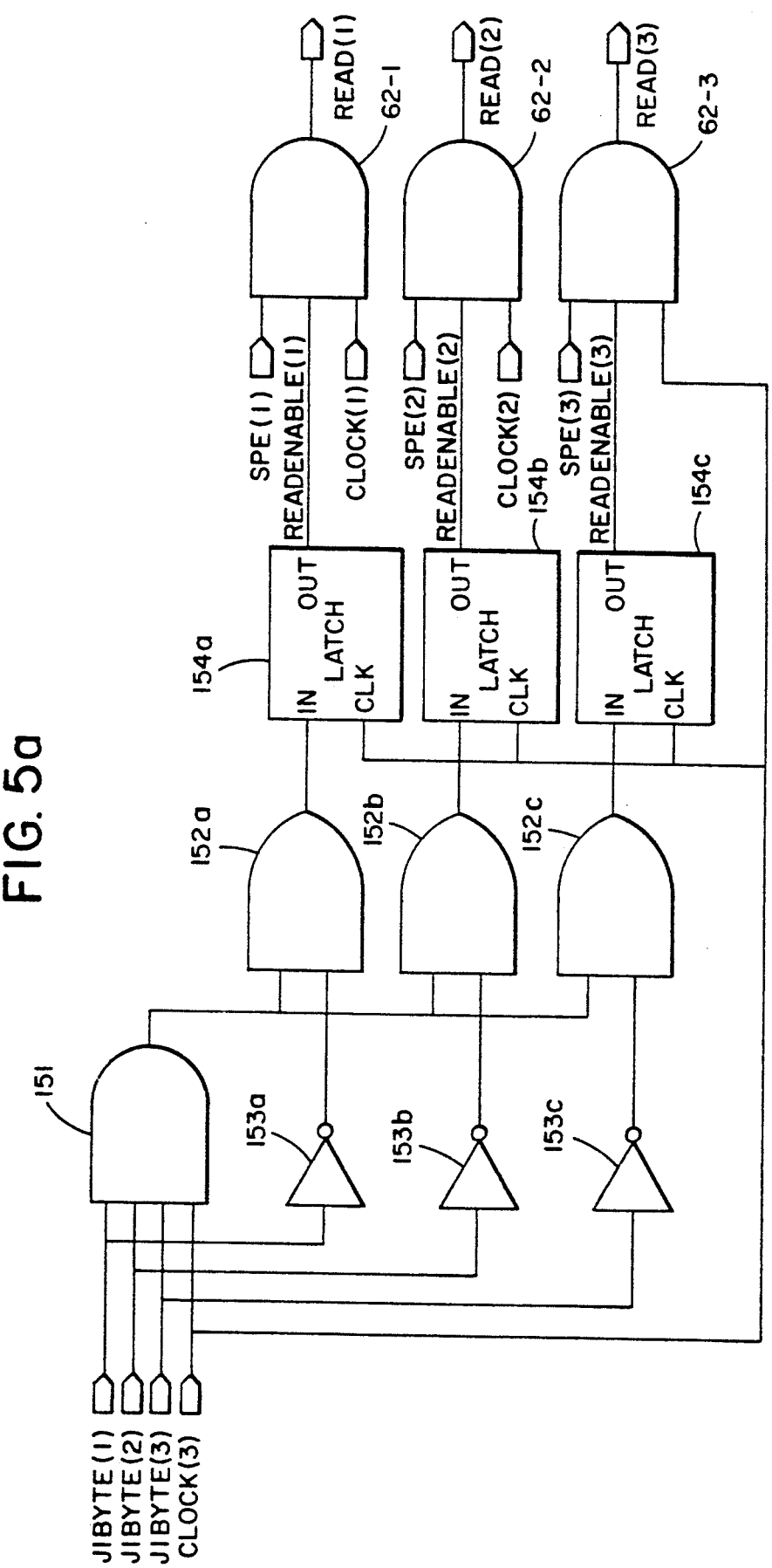
FIG. 5a is a logic diagram of an in apparatus for realigning STS-3C signals.

Because the bytes of the STS-3C signal must be properly aligned, different delays through the FIFOs 45 or through a cross-connect can cause an error in the outgoing STS-3C signal if not properly accounted for. This problem is particularly acute upon start-up, although it can occur during regular operation. In accord with another aspect of the invention, (re)alignment is obtained by requiring that all J1 bytes be available for reading in order and at the same time. This requirement is met by taking the logical AND of the J1 control outputs of the three FIFOs together with the third clock (clock #3). If the logical AND of the four inputs together is a one, then a byte (i.e., the J1 byte) may be read from each FIFO (i.e., the read signal for each FIFO will go high). Of course, where the J1 byte control signal is not exiting any particular FIFO, then as long as the SPE and clock associated with that particular FIFO are high (as described above), a read signal will be generated for that FIFO. Effectively, then, and as seen in FIG. 5a, a read enable signal ReadEn is used as a third input into AND gates 62 in order to permit read signals to be generated, and the read enable signals are generated according to the logical equations:

$ReadEn1 = \{[J1[1] \, AND \, J1[2] \, AND \, J1[3] \, AND \, Clock \, 190 \, 3] \, OR \, [NOT \, J1[1]]\} \text{ Latched with } \{CLOCK \, 3\}$ $ReadEn2 = \{[J1[1] \, AND \, J1[2] \, AND \, J1[3] \, AND \, Clock \, 190 \, 3] \, OR \, [NOT \, J1[1]]\} \text{ Latched with } \{CLOCK \, 3\}$ $ReadEn3 = \{[J1[1] \, AND \, J1[2] \, AND \, J1[3] \, AND \, Clock \, 190 \, 3] \, OR \, [NOT \, J1[1]]\} \text{ Latched with } \{CLOCK \, 3\}$ Implementation of the generating of the read enable signals requires a four input AND gate 151, three OR gates 152a, 152b, 152c, three inverters 153a, 153b, 153c, and three latches 154a, 154b, 154c, as seen in FIG. 5a.

In addition to the read enable signals which are generated, a misalignment occurs. Misalignment (align error) can be defined logically as the state when for any particular J1, the logical AND of the J1 with clock #3 and with the opposite of the logical AND if each of the J1 signals is one. Logically:

$Misalignment = [J1OR] \, AND \, [\overline{J1AND}] \, AND \, [CLOCK \, 3]$ where $J1OR = [J1[1]] \, OR \, [J1[2]] \, OR \, [J1[3]]$ and
where $J1AND = [J1[1]] \, AND \, [J1[2]] \, AND \, [J1[3]]$.

In other words, whenever one of the J1 values is high, if the all three J1 values are not high together at clock 3, there is a misalignment.

Figure 5B:
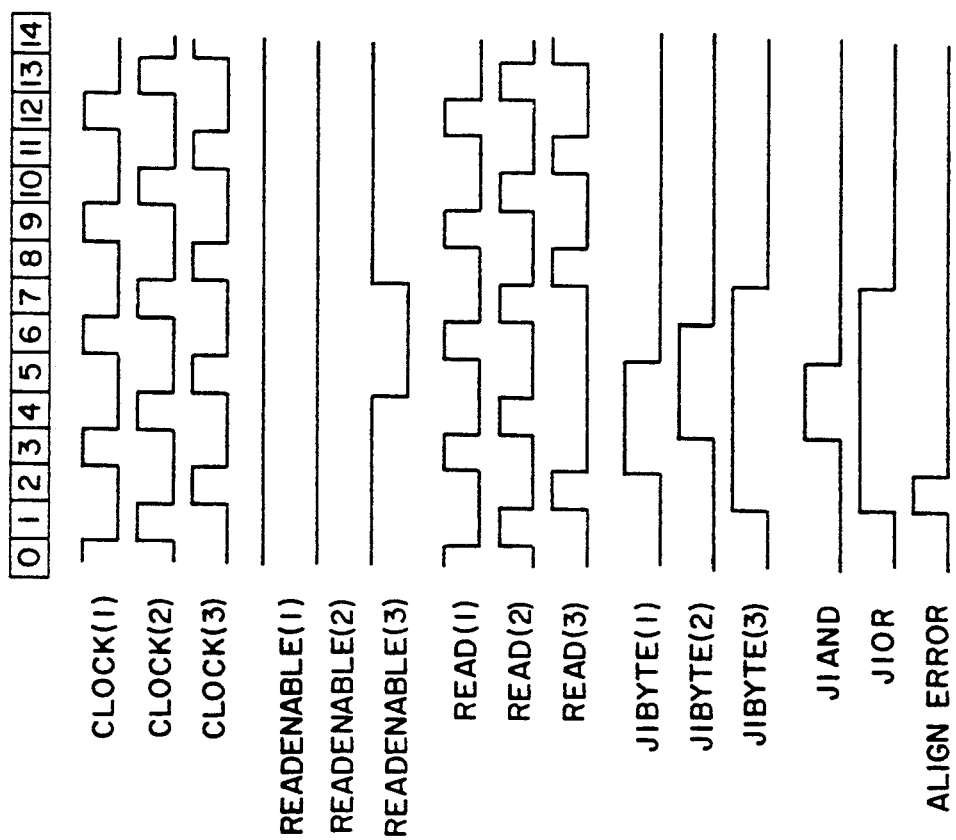
Figure 5C:
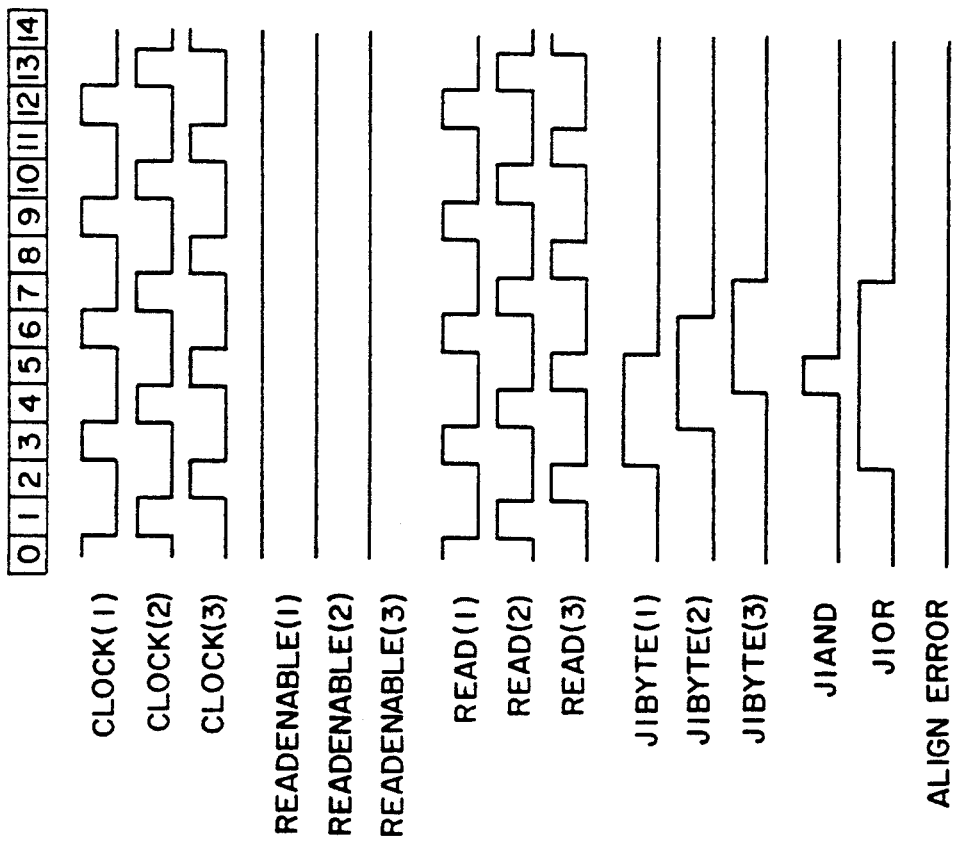

The timing diagrams of FIGS. 5b and 5c further explain the mechanism for realigning misaligned signals. As seen in FIG. 5b, clock #1, clock #2, and clock #3 are staggered, but together represent the outgoing STS-3C clock rate. The read[1], read[2], and read[3] signals are being generated in parallel with the clock #1, clock #2, and clock #3 pulses and hence are also staggered. Similarly, the J1 bytes J1[1], J1[2], J1[3] are staggered, although each is held for three STS-3C clock cycles, such that at a clock #3, all of the J1 bytes are high. Thus, a J1AND signal is generated at clock pulse 5 of FIG. 5b, which pulse occurs concurrent with clock #3. Thus, based on the description above, everything is properly aligned. A J1OR signal is also shown in FIG. 5b.

Turning to FIG. 5c, a misaligned signal is seen with J1[3] occurring before J1[1] and J1[2]. Thus, at pulse 2 J1[3] is high without J1[1] and J1[2] being high, and a misalignment pulse (align error) occurs. As a result of the misalignment, the read enable signal ReadEn3 as seen for clock counts 5-7 does not stay high, and hence the data read from FIFO 45-3 at that time is the previous data and not the J1[3] data byte. As seen in FIG. 5c, at pulses 3 and 4, the J1[1] and J1[2] signals go high. As a result, because J1[3] is still high, J1AND goes high for two clock pulses (4 and 5). Because clock pulse 5 corresponds to clock #3, all three FIFOs are read enabled, and the J1 bytes are read consecutively out of the FIFOs as shown. Thus, the STS-3C signal is now realigned.

In accord with the preferred embodiment of the invention, when any data byte must be reread from a FIFO, an error is flagged by setting a misalignment error bit at the microprocessor interface. The error bit is effectively set according to the logic that when J1OR is high, but J1AND is low, the error bit is set. Also, according to the preferred embodiment of the invention, if the error bit is set and an error reset bit is set by the microprocessor (which is typically done on start-up only), data is sent until the beginning of an SPE subframe. Then, the pointers on the register banks of the FIFOs are realigned such that the read pointer is half a FIFO away from the write pointer; i.e., the FIFO is reset to a depth of fifteen bytes.

It will be appreciated by those skilled in the art that the realignment techniques disclosed herein may also be applied to realignment of STS-1 components of an STS-3C signal where the STS-1 components have been separately sent through a switched network. In such a situation, it is desirable to provide a large RAM space typically divided into three sections in lieu of the three FIFOs, as the delays through the switched network can be considerably different (even hundreds of frames worth) for each STS-1 component, and extremely large FIFOs would be very expensive. In such a situation, it is also necessary to provide a synchronization mechanism beyond the J1 byte realignment mechanism, as it is necessary to realign the frames of one STS-1 component with the corresponding frames of the other STS-1 components. In other words, just aligning the J1 bytes does not guarantee proper realignment, as the J1 byte of one component may be the J1 byte of a different frame when delays are large. Thus, in accord with the invention, the H4 or an undefined POH byte can be used as a synchronization signal. For example, one H4 byte in two hundred fifty-six (256) can be coded with all ones, and the other H4 bytes coded as all zeros or as desired, or the H4 bytes can be coded in a numerical order (one to two hundred fifty-six), and at the realignment circuitry, the H4 byte or other designated POH byte can be monitored such that only when the three H4 bytes have all ones (or the same coded number) and then the J1 byte realignment mechanism is satisfied can the reading from the RAM start. In this manner, not only will the J1 bytes and hence the SPEs be aligned, but the SPEs of one STS-1 component will be aligned with the SPEs of corresponding STS-1 components of the STS-3 signal.

There have been described and illustrated herein apparatus for the retiming and realignment of STS-3 type signals. It will be appreciated that the methods of the invention relate directly to the apparatus. While particular embodiments of the invention have been described, it is not intended that the invention be limited thereto, as it is intended that the invention be as broad in scope as the art will allow and that the specification be read likewise. Thus, while particular logic circuitry has been. disclosed for accomplishing realignment, it will be appreciated that other logic circuitry could be utilized. Also, while a particular TOH synchronous byte (03) was described as being used for permitting tracking of FIFO depth, and while a particular POH byte (J1) was described as being used for accomplishing realignment, it will be appreciated that different bytes could be utilized provided that the byte used for tracking FIFO depth is synchronous with the TOH, while the byte used for establishing realignment of the STS-3C signal is synchronous with the POH. Likewise, a different byte could be used for tracking the number of frames since a last pointer movement was accomplished. Those skilled in the art will further appreciate that while the invention was described with FIFOs of a preferred depth, and hard and soft thresholds of a certain number of bytes, it will be appreciated that FIFOs of a different depth can be utilized, and that the thresholds can be changed, provided, of course, that both hard and soft thresholds are utilized in the retiming mechanism. Similarly, it will be appreciated that more than two FIFO depth thresholds and timing thresholds can be utilized. It will therefore be appreciated by those skilled in the art that yet other modifications could be made to the provided invention without deviating from its spirit and scope as so claimed.

decision.M

R 105,T 6 12

```
1     #include <stdio.h>
2     #include "SafeSyn.h"
3     #define delay 2
4     #define N 3
5     #define I2 ((i+1)*2-1):(i*2)
6     #define I3 ((i+1)*3-1):(i*3)
7     #define I5 ((i+1)*5-1):(i*5)
8
9     #define initial_wrptr 5'13
10    #define soft_threshold 5'4
11    #define hard_threshold 5'8
12    #define incdecNormal 3'0
```

```
13   #define incSoftLimit 3'1
14   #define incHardLimit 3'2
15   #define decSoftLimit 3'3
16   #define decHardLimit 3'4
17   #define short 5'3
18   #define long 5'31
19   #define nom 2'0
20   #define inc 2'1
21   #define dec 2'2
22   #define new 2'3
23
24   MODULE decision ()
25   {
26   IN LOGIC rdbyt3[N];
27   IN LOGIC depthC[N*5];
28   IN LOGIC resetStat[N];
29
30   SIGNAL depthStat_in[N*3];
31   SIGNAL depthStat_out[N*3];
32   MEMORY LOGIC depthStat_ff[N*3];
33
34   /* inc, dec, new */
35   SIGNAL incdecGap_in[N*5];
36   SIGNAL incdecGap_out[N*5];
37   MOMORY LOGIC incdecGap_ff[N*5];
38   SIGNAL incdecState_in[N*2];
39   SIGNAL incdecState_out[N*2];
40   OUT LOGIC incdec[N*2];
41   MEMORY LOGIC incdecState_ff[N*2];
42
43   /* interface signals */
44   IN clkIn;
45   IN LOGIC Ncount[N];
46   IN LOGIC byte[7];
47   IN LOGIC subframe[4];
48
49
50   SIMULATE {
51       int i,j;
52       /*****************************************************************
53        Internally use signals
54       *****************************************************************/
55       incdecGap_out = incdecGap_ff;
56       incdecState_out = incdecState_ff;
57       depthStat_out = depthStat_ff;
58
59       incdecGap_in = UNKNOWN;
60       incdecState_in = UNKNOWN;
61       depthStat_in = UNKNOWN
62
63       for(i=0;i,N;i++) {
```

```
64      if (Ncount[i] & rdbyt3[i] {
65          if(depthC[i5] > (initial_wrptr + hard_threshold)) depthStat_in[i3] = decHardLimit;
66          else if(depthC[i5] > (initial_wrptr + soft_threshold)) depthStat_in[i3] = decSoftLimit;
67          else if(depthC[i5] > (initial_wrptr + hard_threshold)) depthStat_in[i3] = decHardLimit;
68          else if(depthC[i5] > (initial_wrptr + soft_threshold)) depthStat_in[i3] = decSoftLimit;
69          else depthStat_in[i3] = incdecNormal;
70      }
71      else depthStat_in[i3] = depthStat_out[i3];
72
73  /****************************************************************
74      The state Machine for inc/dec/ndf
75      ****************************************************************/
76      if(Ncount[i] & (byte == 7'5) & (subframe == 4'2)) {
77          if(resetStat[i]) incdecState_in[i2] = new;
78          else if ((depthStat_out[i3] == decHardLimit) & (incdecGap_out[i5] > short)) incdecState_in[i2] = dec;
79          else if ((depthStat_out[i3] == decSoftLimit) & (incdecGap_out[i5] == long)) incdecState_in[i2] = dec;
80          else if ((depthStat_out[i3] == decHardLimit) & (incdecGap_out[i5] > short)) incdecState_in[i2] = inc;
81          else if ((depthStat_out[i3] == decHardLimit) & (incdecGap_out[i5] == long)) incdecState_in[i2] = inc;
82          else incdecState_in[i2] = nom;
83          incdecGap_in[i5] = incdecGap_out[i5];
84      }
85      else if(Ncount[i] & (byte == 7'5) & (subframe == 4'3)) {
86          incdecState_in[i2] = nom;
87          if(incdecState_out[i2] != nom) incdecGap_in[i5] = 0;
88          else if(incdecGap_out[i5] == long) incdecGap_in[i5] = long;
89          else incdecGap_in[i5] = incdecGap_out[i5] + 1;
90      }
91      else {
92          incdecState_in[i2] = incdecState_out[i2];
93          incdecGap_in[i5] = incdecGap_out[i5];
94      }
95      }
96
97  /****************************************************************
98      All FF are assigned;
99      ****************************************************************/
100     if(RISE(clkIn)) {
101         incdecGap_ff = incdecGap_in;
102         incdecState_ff = incdecState_in;
103         depthStat_ff = depthStat_in;
104     }
105
106 /****************************************************************
107     All Outputs are assigned at the end;
108     ****************************************************************/
109     incdec = incdecState_ff @ delay;
110 }
111 }
```

We claim:

1. An apparatus for retiming an incoming STS-3 type signal having a first STS-3 rate into a second STS-3 type signal having a second STS-3 rate similar to but not exactly equalling said first STS-3 rate, comprising:
   a) demultiplexer means for receiving a synchronous payload envelope data signal of said incoming STS-3 type signal, an associated synchronous clock of said incoming STS-3 type signal, and at least two control signals including a synchronous payload envelope control signal of said incoming STS-3 type signal, and a first byte control signal which is synchronous with one TOH byte of said incoming STS-3 type signal, said demultiplexer means for demultiplexing said incoming STS-3 type signal into three STS-1 type signals each accompanied by a byte control signal related to said first byte control signal which accompanies at least one byte of each of said three STS-1 type signals;
   b) three FIFO means coupled to said demultiplexer means, each of said FIFO means for receiving one of said STS-1 type signals;
   c) three frame counting means coupled to said demultiplexer means, each frame counting means for counting a number of STS-1 data frames since a last pointer movement relating to said STS-1 type signal;
   d) three FIFO depth measurement means, one coupled to each of said FIFO means, each said FIFO depth measurement means receiving said related byte control signal and determining at least therefrom a number of bytes in said FIFO means;
   e) logic means coupled to said three FIFO depth measurement means and to said three frame counting means, for generating for a particular one of said STS-1 type signals a destuff signal $p-x$ frames after a determination by said logic means that the number of bytes in a particular one of said FIFO means which receives said particular one of said STS-1 type signals exceeds a first threshold value, where p is a integer greater than two, and x equals the number of frames since the last pointer movement or $p-1$ whichever is smaller, and for generating a destuff signal $q-y$ frames after a determination by said logic means that the number of bytes in said particular one of said FIFO means exceeds a second threshold value, where q is a integer greater than one, and y equals the number of frames since the last pointer movement or $q-1$ whichever is smaller, wherein said first threshold is smaller than said second threshold, and q is smaller than p, and wherein said destuff signal triggers a pointer movement; and
   f) multiplexer means for reading data from each of said FIFO means according to said second STS-3 signal rate, and multiplexing said data from each of said FIFO means into an STS-3 payload.

2. An apparatus according to claim 1 wherein:
said logic means generates a stuff signal $r-u$ frames after a determination by said logic means that the number of bytes in said particular FIFO means is less than a third threshold value, where r is an integer greater than two and u equals the number of frames since the last pointer movement or $r-1$ whichever is smaller, and generates a stuff signal $s-z$ frames after a determination by said logic means that the number of bytes in said particular FIFO means is less then a fourth threshold value, wherein s is an integer greater than one and z equals the number of frames since the last pointer movement or $s-1$ whichever is smaller, wherein said fourth threshold is smaller than said third threshold, and s is smaller than r, and wherein said stuff signal triggers a second pointer movement.

3. An apparatus according to claim 2, wherein:
p is equal to r, and q is equal to s.

4. An apparatus according to claim 3, wherein
said first threshold is equal to a half full FIFO plus a first number of bytes, and said third threshold is equal to a half full FIFO minus said first number of bytes, and
said second threshold is equal to a half full FIFO plus a second number of bytes, and said fourth threshold is equal to a half full FIFO minus said second number of bytes, wherein said second number of bytes is more than said first number of bytes.

5. An apparatus according to claim 4, wherein:
p is equal to thirty-two bytes, and q is equal to four bytes.

6. An apparatus according to claim 1, wherein:
each said related byte control signal is a control signal accompanying a first synchronous payload envelope (SPE) byte after a C1 TOH byte of the respective STS-1 type signal.

7. An apparatus according to claim 1, wherein:
each STS-1 type signal includes a data payload, and
each said FIFO means is at least nine bits wide, with eight bits for bytes of said data payloads, and at least one bit for said related control byte signal, and each said FIFO depth measurement means is coupled to an output of said FIFO means for determining when said related control byte signal is read from said FIFO means, wherein said FIFO depth measurement means comprises a counting means for counting the number of bytes written into said FIFO means between the writing of said related control byte signal and the reading of said related control byte signal from said FIFO means.

8. An apparatus according to claim 4, wherein:
each said related byte control signal is a control signal accompanying a first synchronous payload envelope (SPE) byte after a C1 TOH byte of the respective STS-1 type signal,
each STS-1 type signal includes a data payload, and
each said FIFO means is at least nine bits wide, with eight bits for bytes of said data payloads, and at least one bit for said related control byte signal, and each said FIFO depth measurement means is coupled to an output of said FIFO means for determining when said related control byte signal is read from said FIFO means, wherein said FIFO depth measurement means comprises a counting means for counting the number of bytes written into said FIFO means between the writing of said related control byte signal and the reading of said related control byte signal from said FIFO means.

9. An apparatus according to claim 4, further comprising:
pointer calculation means coupled to said logic means for generating H1H2 pointer values for said second STS-3 type signal based at least partially on pointer movement indications provided by said logic means, said pointer calculation means also coupled to said multiplexer means for providing said H1H2 pointer values to said multiplexer means for multiplexing into said second STS-3 type signal.

10. An apparatus according to claim 4, wherein:
said demultiplexer means receives a third control signal related to a predetermined byte of said incoming STS-3 type signal, and said third control signal is sent to each of said frame counting means for updating the counts of said frame counting means.

11. An apparatus according to claim 4, wherein:
said first number of bytes is four.

12. A method for retiming an incoming STS-3 type signal having a first STS-3 rate into a second STS-3 type signal having a second STS-3 rate similar to but not exactly equalling said first STS-3 rate, comprising:
   a) receiving a synchronous payload envelope data signal of said incoming STS-3 type signal, an associated synchronous clock of said incoming STS-3 type signal, and at least two control signals including a synchronous payload envelope control signal of said incoming STS-3 type signal, and a first byte control signal which is synchronous with one TOH byte of said incoming STS-3 type signal;
   b) demultiplexing said incoming STS-3 type signal into three STS-1 payload signals each accompanied by a byte control signal related to said first byte control signal which accompanies at least one byte of each of said three STS-1 payload signals;
   c) sending said three STS-1 payload signals and the related byte control signal to three FIFO means;
   d) for each STS-1 payload counting frames of the incoming signal, and resetting the count upon a pointer movement for the particular STS-1 payload;
   e) measuring the depth of each FIFO by tracking the related byte control signal;
   f) based on the measured depth of the particular FIFO and the related frame count, generating for each STS-1 payload signal a destuff signal $p-x$ frames after determining that a number of bytes in the particular FIFO means exceeds a first threshold value, where p is an integer greater than two and x equals the number of frames since the last pointer movement or $p-1$ whichever is smaller, and generating a destuff signal $q-y$ frames after a determination that the number of bytes in the particular FIFO means exceeds a second threshold value, where q is an integer greater than one and y equals the number of frames since the last pointer movement or $q-1$ whichever is smaller, wherein said first threshold is smaller than said second threshold, and q is smaller than p, and wherein the destuff signal triggers a pointer movement; and
   g) multiplexing the STS-1 payload data from each of said FIFO means into said second STS-3 type signal at said second STS-3 signal rate.

13. A method according to claim 12, further comprising:
for each STS-1 payload signal, generating a stuff signal $r-u$ frames after determining that the number of bytes in said particular FIFO means is less than a third threshold value, where r is an integer greater than two and u equals the number of frames since the last pointer movement or $r-1$ whichever is smaller, and generating a stuff signal $s-z$ frames after a determination that the number of bytes in said particular FIFO means is less then a fourth threshold value, wherein s is an integer greater than one and z equals the number of frames since the last pointer movement or $s-1$ whichever is smaller, wherein said fourth threshold is smaller than said third threshold, and s is smaller than r, and wherein said stuff signal triggers a second pointer movement.

14. A method according to claim 13, wherein:
p is equal to r, and q is equal to s.

15. A method according to claim 14, wherein:
said first threshold is equal to a half full FIFO plus a first number of bytes, and said third threshold is equal to a half full FIFO minus said first number of bytes, and
said second threshold is equal to a half full FIFO plus a second number of bytes, and said fourth threshold is equal to a half full FIFO minus said second number of bytes, wherein said second number of bytes is more than said first number of bytes.

16. A method according to claim 15, wherein:
p is equal to thirty-two bytes, and q is equal to four bytes.

17. A method according to claim 12, wherein:
each said related byte control signal is a control signal accompanying a first synchronous payload envelope (SPE) byte after a C1 TOH byte of the respective STS-1 payload signal.

18. A method according to claim 15, wherein:
said first number of bytes is four.

19. An apparatus for retiming an incoming STS-3C type signal having a first STS-3 rate into a second STS-3C type signal having a second STS-3 rate similar to but not exactly equalling said first STS-3 rate, comprising:
   a) demultiplexer means for receiving a synchronous payload envelope data signal of said incoming STS-3C type signal, an associated synchronous clock of said incoming STS-3C type signal, and at least two control signals including a synchronous payload envelope control signal of said incoming STS-3C type signal, and a first byte control signal which is synchronous with one TOH byte of said incoming STS-3C type signal, said demultiplexer means for demultiplexing said incoming STS-3C type signal into three STS-1 payload signals each accompanied by a byte control signal related to said first byte control signal which accompanies at least one byte of each of said three STS-1 payload signals;
   b) data storage means coupled to said demultiplexer means, said data storage means for separately storing said STS-1 payload signals;
   c) frame counting means coupled to said demultiplexer means, said frame counting means for counting a number STS-3C data frames since a last pointer movement relating to said second STS-3C type signal;
   d) data storage measurement means coupled to said data storage means, said data storage measurement means for receiving said related byte control signal and determining at least therefrom a number of bytes for each of said STS-1 payload signals in said data storage means;
   e) logic means coupled to said data storage means and said frame counting means, for generating a destuff signal $p-x$ frames after a determination by said logic means that the number of bytes for each of said STS-1 payload signals in said data storage means exceeds a first threshold value, where p is an integer greater than two and x equals the number of frames since the last pointer movement or $p-1$ whichever is smaller, and for generating a destuff signal $q-y$ frames after a determination by said logic means that the number of bytes in said data storage means for at least one of said STS-1 payload signals exceeds a second threshold value and that the number of bytes in said data storage means of the other STS-1 payload signals exceed a third threshold, where q is an integer greater than one and y equals the number of frames since the last pointer movement or q−1 whichever is smaller, wherein said first threshold is smaller than said second threshold, and said third threshold is smaller than said second threshold, and q is smaller than p, and wherein said destuff signal triggers a pointer movement for said second STS-3C type signal; and f) multiplexer means for reading said separately stored data in said data storage means at said STS-3 signal rate, and multiplexing said separately stored data into an STS-3C payload.

20. An apparatus according to claim 19, wherein:
said logic means generates a stuff signal r−u frames after a determination by said logic means that the number of bytes in said data storage means for each of said STS-1 payload signals is less than said third threshold value, where u equals the number of frames since the last pointer movement or r−1 whichever is smaller, and generates a stuff signal s−z frames after a determination by said logic means that the number of bytes in said data storage means for any of said STS-1 payload signals is less then a fourth threshold value and the number of bytes in said data storage means for the others of said STS-1 payload signals is less than said second threshold, wherein z equals the number of frames since the last pointer movement or s−1 whichever is smaller, wherein said fourth threshold is smaller than said third threshold, and s is smaller than r, and wherein said stuff signal triggers a second pointer movement for said second STS-3C type signal.

21. An apparatus according to claim 20, wherein:
said data storage means comprises three FIFO means, and said data storage measurement means comprises three FIFO depth measurement means.

22. An apparatus according to claim 20, further comprising:
realignment means for realigning said STS-1 payload signals.

23. An apparatus according to claim 22, wherein:
said demultiplexer means receives a third control signal synchronous with a predetermined synchronous payload envelope (SPE) byte, and provides a second byte control signal related to said third control signal, and said realignment means comprises logic means for determining whether at a clock associated with a designated of said STS-1 signals, the type of each of said STS-1 payload to be read by said multiplexer means is said predetermined SPE byte, and for inhibiting a read of said predetermined SPE byte for any particular STS-1 payload otherwise.

24. An apparatus according to claim 23, wherein:
said predetermined SPE byte is a J1 byte.

25. An apparatus according to claim 23, wherein:
p is equal to r, and q is equal to s.

26. An apparatus according to claim 25, wherein:
said data storage means comprises three FIFO means, and said data storage measurement means comprises three FIFO depth measurement means, and said first threshold is equal to a half full FIFO plus a first number of bytes, and said third threshold is equal to a half full FIFO minus said first number of bytes, and said second threshold is equal to a half full FIFO plus a second number of bytes, and said fourth threshold is equal to a half full FIFO minus said second number of bytes, wherein said second number of bytes is more than said first number of bytes.

27. An apparatus according to claim 26, wherein:
p is equal to thirty-two bytes, and q is equal to four bytes.

28. An apparatus according to claim 26, wherein:
each said related byte control signal is a control signal accompanying a first SPE byte after a C1 TOH byte of the respective STS-1 type signal, and said predetermined SPE byte is a J1 byte.

29. An apparatus according to claim 28, wherein:
each said FIFO means is at least ten bits wide, with eight bits for bytes of said data payloads, one bit for said related control byte signal, and one bit for said second byte control signal, and each said FIFO depth measurement means is coupled to an output of said FIFO means for determining when said related control byte signal is read from said FIFO means, wherein said FIFO depth measurement means comprises a counting means for counting the number of bytes written into said FIFO means between the writing of said related control byte signal and the reading of said related control byte signal from said FIFO means.

* * * * *